(12) United States Patent
Lauk et al.

(10) Patent No.: US 6,177,742 B1
(45) Date of Patent: Jan. 23, 2001

(54) ELECTRIC DRIVE UNIT WITH A BUSH HAVING DIFFERENT DIAMETERS

(75) Inventors: Detlef Lauk, Renchen; Ernst Fischer, Gernsbach; Hansjoerg Karcher, Buehlertal; Juergen Herp, Buehl; Richard Hurst, Offenburg, all of (DE)

(73) Assignee: Robert Bosch GmbH, Stuttgart (DE)

( * ) Notice: Under 35 U.S.C. 154(b), the term of this patent shall be extended for 0 days.

(21) Appl. No.: 09/254,066

(22) PCT Filed: Jun. 23, 1998

(86) PCT No.: PCT/DE98/01714

§ 371 Date: Feb. 26, 1999

§ 102(e) Date: Feb. 26, 1999

(87) PCT Pub. No.: WO99/00278

PCT Pub. Date: Jan. 7, 1999

(30) Foreign Application Priority Data

Jun. 26, 1997 (DE) .............................................. 197 27 203
May 12, 1998 (DE) .............................................. 198 21 079

(51) Int. Cl.$^7$ .............................. H02K 7/10; H02K 49/00
(52) U.S. Cl. .......................................... 310/75 R; 310/99
(58) Field of Search .................................... 310/75 R, 80, 310/83, 96, 99, 40.5

(56) References Cited

U.S. PATENT DOCUMENTS

| | | | | |
|---|---|---|---|---|
| 4,367,660 | * | 1/1983 | Becker et al. .......................... | 74/625 |
| 4,369,387 | * | 1/1983 | Haar et al. .............................. | 310/83 |
| 4,944,375 | * | 7/1990 | Ohta et al. ............................. | 192/8 R |
| 5,053,661 | * | 10/1991 | Kitamura et al. ...................... | 310/83 |
| 5,325,736 | * | 7/1994 | Tsujita ..................................... | 74/425 |
| 6,051,899 | * | 4/2000 | Walther et al. ......................... | 310/71 |

\* cited by examiner

*Primary Examiner*—Thomas M. Dougherty
*Assistant Examiner*—Guillermo Perez
(74) *Attorney, Agent, or Firm*—Ronald E. Greigg; Edwin E. Greigg

(57) ABSTRACT

An electric drive unit, for windshield wipers of a motor vehicle, including a drive motor, having an armature accommodated in a substantially cup-shaped pole housing, and including a gearbox, secured by a face end to the pole housing for receiving at least one worm, wheel supported on a power takeoff shaft. The worm wheel engages a worm connected to an armature shaft of the drive motor. The power takeoff shaft is supported in an eccentric bush which is rotatable to set the axial spacing between the armature shaft and the power takeoff shaft and can be mounted in the rotated state, in a manner fixed against relative rotation, in the gearbox. The eccentric bush is embodied in a graduated fashion, such that it has a larger diameter on a side toward the flange than on another side remote from the flange.

11 Claims, 4 Drawing Sheets

ELECTRIC DRIVE UNIT WITH A BUSH HAVING DIFFERENT DIAMETERS

PRIOR ART

The invention relates to an electric drive unit useful for a windshield wiper. An electric drive unit is already known (German Patent Disclosure DE 44 19 769 A1) in which a worm wheel is supported on a power takeoff shaft. To set an axial spacing between an armature shaft of the drive motor, the power takeoff shaft is supported in an eccentric bush. The eccentric bush is relatively long, is embodied without graduations, and is retained in the housing in a relatively long, ungraduated cylindrical bore by a press fit. The housing having the bore is typically made by metal casting. Embodying the relatively long bore in the housing, which must be made to precise tolerances so that the eccentric bush can be received in it with a press fit, requires intensive post-machining after the casting operation; but in mass production, this is very expensive.

Further drive units are known for instance from German Patent Disclosures DE 32 20 191 A1, DE 32 35 622 A1, and DE 41 16 100 A1 and from German Patent DE 39 30 144 C2.

Because of the worm gears used, both low rotary speeds of the windshield wiper and at the same time high torques are attainable. To meet the demands made of such drive units for motor vehicle windshield wipers in terms of noise, the gear meshing (torsional flank clearance) must remain constant regardless of production variations. To eliminate or at least minimize production variations, the axial spacing of the power takeoff shaft and the armature shaft must therefore be set very precisely during assembly.

This can be done for instance by means of a slightly canted position of the armature.

Furthermore, in known wiper motors, the spacing between the armature shaft and the power takeoff shaft can also be set by means of interchangeable worm wheels, each having a pitch circle diameter adapted to the axial spacing. Then the particular worm wheel in which an optimal axial spacing is brought about between the armature shaft, with the worm secured to it, and the power takeoff shaft, with the worm wheel secured to it, can be selected from among a plurality of worm wheels of different pitch circle diameters.

In addition, worm wheels with half-global toothing are used, which can be mounted at adjustable heights on the power takeoff shaft by placing one or more shims under them; as a result, the engagement diameter can be varied slightly, and can be set to an exact spacing between the worm and the worm wheel. A problematic aspect, though, is not only that to assemble the power takeoff shaft and the worm wheel, many different parts are needed, such as a plurality of worm wheels of different pitch circle diameter or a plurality of shims, but also that assembling the power takeoff shaft and worm wheel encompasses a very high number of steps and thus is time-consuming.

ADVANTAGES OF THE INVENTION

The electric drive unit according to the invention, has the advantage over the prior art that it can be made more simply and economically. In particular, post-machining of the gearbox, in which the eccentric bush is supported for instance in a power takeoff dome and which is usually a cast metal part, is unnecessary, since because of the graduated embodiment of the outer cylindrical surface of the eccentric bush, which has a smaller diameter on its side toward the worm wheel than on its side remote from the worm wheel, the resultant bores in the gearbox are correspondingly graduated and short, and the gearbox can be produced simply, to close tolerances, in an intended casting operation for making the gearbox, and unmolding of the completed cast gearbox is especially simple.

By means of the provisions recited herein, advantageous refinements of an improvements to the drive unit defined are possible.

One such eccentric bush, that is, a bush whose bore is eccentrically disposed, and which is rotatable to set the axial spacing between the armature shaft and the power takeoff shaft and can be mounted in the rotated state in a manner secured against relative rotation, has the especially great advantage that additional parts, such as additional worm wheels or shims, can be omitted entirely, thus reducing the cost for material, and that moreover very simple and in particular very quick assembly is possible. Setting a desired axial spacing between the power takeoff shaft and the armature shaft requires merely rotating the eccentric bush and the power takeoff shaft supported in it, before the eccentric bush is finally secured in that position.

Even relatively great production variations can be compensated for by the choice of the eccentricity of the inner bore.

Purely in principle, the most various options for rotating the eccentric bush in the gearbox are possible. One advantageous embodiment provides that the eccentric bush is rotatable in infinitely graduated fashion. In this way, an extremely precise setting of the axial spacing between the armature shaft and the power takeoff shaft can be accomplished.

In another advantageous embodiment, it is provided that the eccentric bush has a plurality of detent elements, which are secured to the flange embodied on its face end and which, being offset from one another by equal angles, engage detent elements provided in complementary fashion in the gearbox. Not only do these detent elements enable rotation of the eccentric bush in stages; at the same time the detent elements, engaging one another in a manner fixed against relative rotation in the mounted state also embody a torsion-securing means.

In a preferred embodiment, which meets most requirements, it is provided that the detent elements are each offset from one another by an angle of 30°.

The eccentric bush itself may comprise the most various materials. Particularly with a view to simple production of the eccentric bush, it is preferably provided that the eccentric bush is of plastic.

Thus, by way of example, the eccentric bush can be made in the form of an injection-molded part.

In particular to prevent dirt from getting into the bearing of the power takeoff shaft, it is provided in an advantageous embodiment that a sealing lip is injection-molded onto the flange of the eccentric bush.

To assure good lubrication of the power takeoff shaft in the eccentric bush, it is preferably provided that lubrication grooves are embodied on an inner cylindrical surface of the eccentric bush.

To use particularly over a wide temperature range, which can range for instance from −30° C. to +80° C., and thereby to prevent the eccentric bush from shrinking onto the power takeoff shaft, it may be provided that the eccentric bush is slit over its entire length.

BRIEF DESCRIPTION OF THE DRAWINGS

Further characteristics and advantages of the invention are the subject of the ensuing description and of the drawings showing several exemplary embodiments.

In the drawing.

DESCRIPTION OF THE PREFERRED EMBODIMENTS

Figure 2:
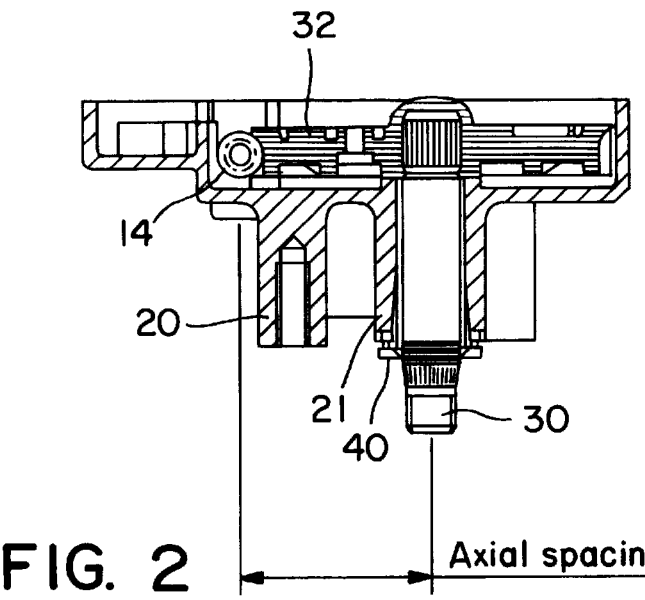
FIG. 2 is a sectional view taken along the line II—II of FIG. 1.
Figure 1:
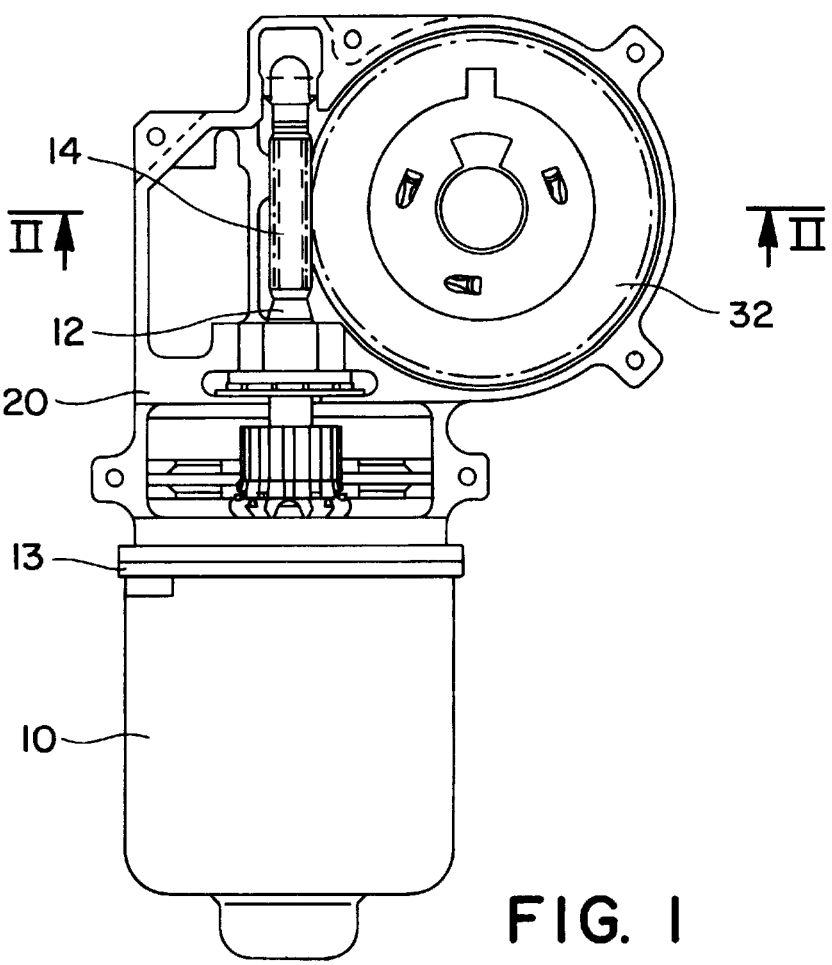
FIG. 1 is a plan view of a drive unit according to the invention, with the gearbox cover removed.

An electric drive unit, shown in FIGS. 1 and 2, for windshield wipers of a motor vehicle includes a substantially cup-shaped pole housing 10, in which an armature is accommodated. A likewise substantially cup-shaped gearbox 20 is secured on its face end to a flange 13 of the pole housing 10. Disposed in the gearbox 20 is a worm wheel 32, which is secured to a power takeoff shaft 30 and engages a worm 14 connected to an armature shaft 12 of the armature. This worm gear comprising the worm wheel 32 and the worm 14 makes the requisite rotary speeds and torques in a wiper motor possible.

To enable setting an exact axial spacing a between the armature shaft 12, and thus the worm 14, and the power takeoff shaft 30, and thus the worm wheel 32, the power takeoff shaft 30 is supported in an eccentric bush 40, which is secured in a dome 21 embodied in the gearbox 20.

Figure 3:
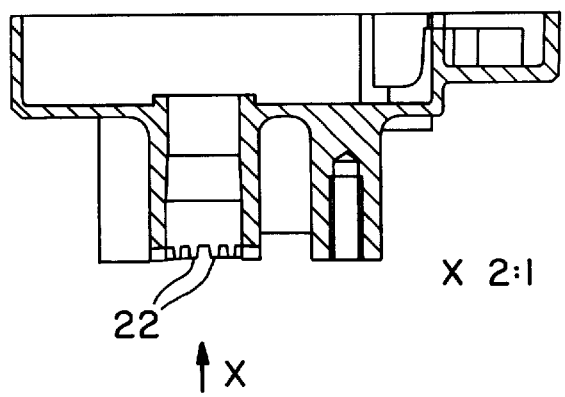
FIG. 3 is a sectional view of a gearbox of a drive unit according to the invention.
Figure 5:
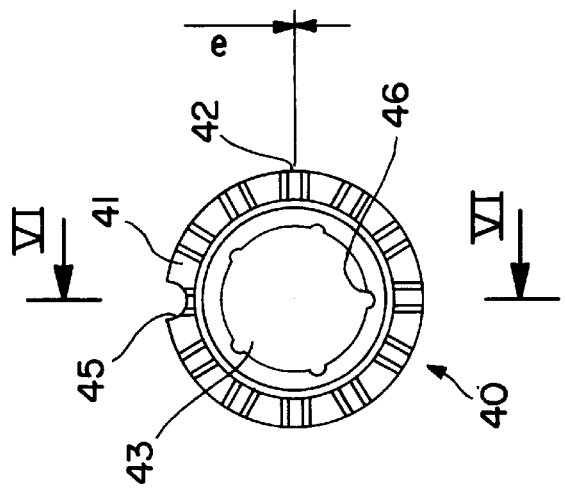
FIG. 5 is a plan view on an eccentric bush.
Figure 6:
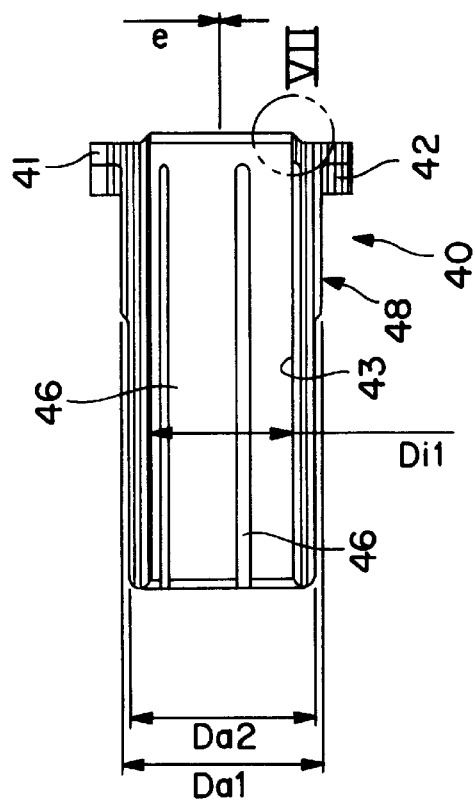
FIG. 6 is a sectional view of the eccentric bush taken along the line VI—VI of FIG. 5.

As seen particularly in FIGS. 5 and 6, the eccentric bush 40 on its face end 41 has detent elements 42, secured to a flange disposed on the face end 41 of the eccentric bush, which are offset from one another by equal angles and which in the mounted state engage complementary detent elements 22 (see FIG. 3) embodied in the gearbox 20 (see FIG. 2). As shown particularly in FIGS. 5 and 6, the inner bore 43 or the inner cylindrical surface of the eccentric bush 40 is disposed eccentrically (eccentricity e).

Figure 4:
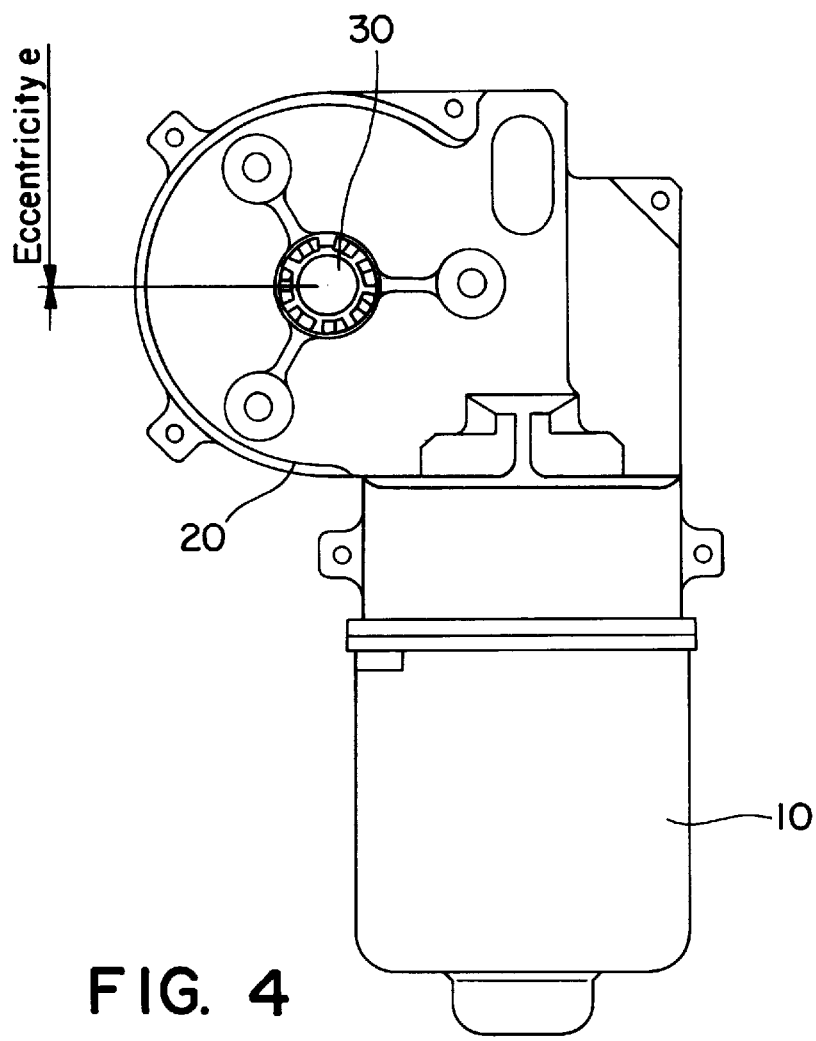
FIG. 4 is a view from below of a drive unit according to the invention, with the eccentric bush inserted.

In the mounted state of the eccentric bush 40 in the dome 21, this leads to a power takeoff shaft 30 which is disposed eccentrically, in comparison to the bore in the dome 21 having the eccentricity e; this is schematically illustrated in FIG. 4, which shows the power takeoff shaft 30 mounted in the gearbox 20 in the eccentric bush 40.

By means of this eccentric disposition of the power takeoff shaft 30 in the gearbox 20, precise setting of the axial spacing a between the armature shaft 12, and thus the worm 14, and the power takeoff shaft 30 with the worm wheel 32 becomes possible. This is done in that in the preassembled state, the axial spacing a of the worm wheel 32 and the worm 14 is set by incrementally rotating the eccentric bush 40 by the same angle.

Figure 8:
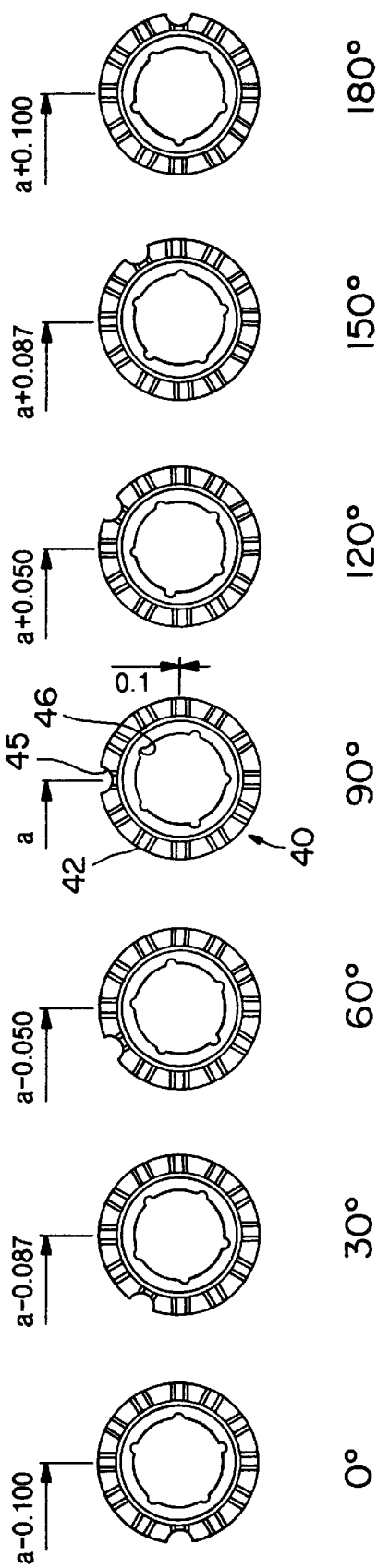
FIG. 8 shows various positions of an eccentric bush, used in a drive unit according to the invention, for supporting the power takeoff shaft.

In FIG. 8, various positions of the eccentric bush 40 before it is secured in final form are shown. As can be seen from FIG. 8, the axial spacing a can be varied by very tiny amounts by rotating the eccentric bush 40. For easy detection of the rotated position of the eccentric bush 40 and for assembling and delivering it in the correct position, a notch 45 is provided in its flange on the face end.

As seen particularly from FIGS. 3, 4, 5 and 8, the detent elements 42 are each offset from one another, by angles of 30° for instance. It is understood that other angles can also be considered, depending on the adjustability and precision required. As soon as the corrected desired axial spacing a is attained, the eccentric bush 40 is then secured in final form in the dome 21; the detent elements 42 of the eccentric bush 40 engage the detent elements 22 disposed on the gearbox, and thus they make it possible to mount the eccentric bush 40 in the gearbox 20 in a manner secure against relative torsion. By means of this mounting, it is possible in particular to dispense with additional parts, such as a range of slightly different, tolerance-adapted worm wheels 32, or shims that allow changing the position of the worm wheel 32 in the axial direction of the power takeoff shaft 30.

Furthermore, the variation and setting of the axial spacing a and the assembly can be accomplished very quickly.

The eccentric bush 40 is preferably a plastic part.

On the inner cylindrical surface of the eccentric bush 40, lubrication grooves 46 are provided, which enable optimal lubrication of the power takeoff shaft 30 supported in the eccentric bush 40. The eccentric bush 40 can moreover be slit, to prevent it from shrinking onto the power takeoff shaft 30, something that could otherwise happen because of the wide temperature range in which such drive units are used, which ranges from approximately −30° C. to approximately +80° C., and because the bearing play is so slight.

As seen particularly in FIG. 6, the outer cylindrical surface 48 of the eccentric bush is graduated, in such a way that the eccentric bush 40 has a larger diameter on its side toward the flange 41 than on its side remote from the flange 41 (Da1>Da2). By embodying the eccentric shaft 40 in this way, post-machining of the gearbox 20, which is a cast metal part, is avoided. By means of the complementary embodiment of the power takeoff dome 21, which likewise has a graduated diameter, unmolding from one side of the gearbox 20 is made possible, and as a result very good coaxiality of the bore is achieved. The flange 41 acts as a run-up face for the worm wheel 32 and represents its axial boundary.

The cross-sectional reduction of the eccentric bush 40 from Da1 to Da2 is provided approximately in the middle of the longitudinal length of the eccentric bush 40. As FIG. 6 shows, the cross-sectional reduction can also be provided somewhat outside the middle, closer to the region of the middle toward the flange 41.

Figure 7:
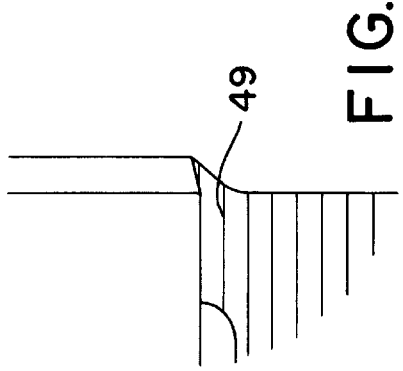
FIG. 7 is a detail, marked VII in FIG. 6, showing a sealing lip disposed on the eccentric bush.

The eccentric bush 40 can furthermore have an injection-molded sealing lip 49, which prevents dirt from entering the bearing of the power takeoff shaft 30. This detent element 40 is disposed on the inner bore of the eccentric bush 40, protrudes slightly toward the axis of the eccentric bush 40 (see FIG. 7), and in the mounted state of the power takeoff shaft 30 rests on it, exerting a contact pressure on it.

The foregoing relates to preferred exemplary embodiments of the invention, it being understood that other variants and embodiments thereof are possible within the spirit and scope of the invention, the latter being defined by the appended claims.

What is claimed is:

1. An electric drive unit for windshield wipers of a motor vehicle, comprising a drive motor, having an armature accommodated in a substantially cup-shaped pole housing (10), and including a gearbox (20), secured by a face end to the pole housing (10) for receiving at least one worm wheel (32) supported on a power takeoff shaft (30), the worm wheel engages a worm (14) connected to an armature shaft (12) of the drive motor, the power takeoff shaft (30) is supported in an eccentric bush (40) which is rotatable to set an axial spacing (a) between the armature shaft (12) and the power takeoff shaft (30) and is mounted for rotation, in a manner fixed against relative rotation, in the gearbox (20), and the eccentric bush (40) having a flange (41) that protrudes from an outer cylindrical surface (48), the eccentric bush (40) is embodied in graduated fashion, such that the bush has a larger diameter on a side toward the flange (41) than on another side remote from the flange (41).

2. The electric drive unit according to claim 1, in which the eccentric bush (40) is rotatable in infinitely graduated fashion.

3. The electric drive unit according to claim 1, in which the eccentric bush (40) has a plurality of detent elements (42), which are secured to the flange (41) embodied on a face end and which, being offset from one another by equal angles, engage detent elements (22) provided in complementary fashion in the gearbox (20).

4. The electric drive unit according to claim 3, in which the respective detent elements (42 and 22) are each offset from another by an angle of 30°.

5. The electric drive unit according to claim 1, in which the eccentric bush (40) is of plastic.

6. The electric drive unit according to claim 5, in which a sealing lip (49) protruding toward the axis is injection-molded onto the flange (41) of the eccentric bush (40).

7. The electric drive unit according to claim 5, in which lubrication grooves (46) are embodied on an inner cylindrical surface of the eccentric bush (40).

8. The electric drive unit according to claim 7, in which the eccentric bush (40) is slit axially over its entire length.

9. The electric drive unit according to claim 1, in which the eccentric bush (40) is retained in the gearbox (20) by a press fit.

10. The electric drive unit according to claim 1, in which a cross-sectional reduction from Da1 to Da2 of the eccentric bush (40) is provided approximately in a region of a middle of the longitudinal length of the eccentric bush (40).

11. The electric drive unit according to claim 1, in which a cross-sectional reduction from Da1 to Da2 of the eccentric bush (40) is provided in a region somewhat outside of a middle of the longitudinal length of the eccentric bush (40) closer to the region toward the flange (47).

* * * * *